United States Patent
Adam et al.

(10) Patent No.: US 8,544,333 B2
(45) Date of Patent: Oct. 1, 2013

(54) AIR PRESSURE SENSOR FOR IMPACT RECOGNITION

(75) Inventors: Boris Adam, Gaeufelden (DE); Martin Schuerer, Aichtal (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 12/736,497

(22) PCT Filed: Feb. 26, 2009

(86) PCT No.: PCT/EP2009/052248
§ 371 (c)(1),
(2), (4) Date: Dec. 28, 2010

(87) PCT Pub. No.: WO2009/130076
PCT Pub. Date: Oct. 29, 2009

(65) Prior Publication Data
US 2011/0094305 A1    Apr. 28, 2011

(30) Foreign Application Priority Data
Apr. 25, 2008   (DE) .................... 10 2008 001 393

(51) Int. Cl.
*G01L 9/00*   (2006.01)
*G01L 7/00*   (2006.01)

(52) U.S. Cl.
USPC .............................................. 73/708; 73/706

(58) Field of Classification Search
USPC ................................................... 73/700–756
See application file for complete search history.

(56) References Cited

U.S. PATENT DOCUMENTS

| | | | | |
|---|---|---|---|---|
| 5,029,478 A | * | 7/1991 | Wamstad | ......................... 73/706 |
| 5,747,694 A | * | 5/1998 | Baba et al. | ...................... 73/723 |
| 6,046,667 A | * | 4/2000 | Mathias | .......................... 338/36 |
| 8,109,148 B2 | * | 2/2012 | Habibi et al. | ................... 73/708 |
| 2002/0069700 A1 | * | 6/2002 | Dirmeyer et al. | ............... 73/431 |
| 2009/0238657 A1 | * | 9/2009 | Brandt et al. | ..................... 411/44 |
| 2009/0293629 A1 | * | 12/2009 | Henzler et al. | .................. 73/756 |
| 2011/0041594 A1 | * | 2/2011 | Eslami et al. | .............. 73/114.43 |
| 2011/0296927 A1 | * | 12/2011 | Hopman et al. | ................ 73/723 |

FOREIGN PATENT DOCUMENTS

| | | |
|---|---|---|
| DE | 195 06 014 | 8/1996 |
| DE | 195 44 974 | 5/1997 |
| EP | 1 132 742 | 9/2001 |

\* cited by examiner

*Primary Examiner* — Andre Allen
(74) *Attorney, Agent, or Firm* — Kenyon & Kenyon LLP

(57) ABSTRACT

An air pressure sensor (100) for impact recognition is provided, having a chamber (R), and a sensor element (S) for generating a signal as a function of the air pressure being situated in the chamber (R). The chamber (R) is sealed off by a pressure compensation element (M, MV). The pressure compensation element (M, MV) is designed in such a way that penetration of interfering substances into the chamber (R) is prevented. However, transmission of pressure into the chamber (R) from the outside is possible.

17 Claims, 5 Drawing Sheets

AIR PRESSURE SENSOR FOR IMPACT RECOGNITION

CROSS REFERENCE TO RELATED APPLICATION

This application claims priority to PCT/EP 2009/052248 filed as an International Application on Apr. 25, 2008.

BACKGROUND OF THE INVENTION

1. Field of the Invention

The present invention relates to an air pressure sensor for impact recognition.

2. Description of Related Art

An air pressure sensor by the applicant which is marketed under the name PPS1 is known. This air pressure sensor measures the pressure in a side portion of a vehicle in the so-called wet space of the doors. The door also has a dry space. The air pressure sensor is installed on the partition between the wet space and the dry space. This is carried out in such a way that either the sensor element is situated in the dry space and the pressure inlet channel projects into the wet space, or the entire air pressure sensor is installed in the wet space. In most cases, the boreholes in the partition which are required for installation must be sealed off using a seal, situated on the sensor, by installing the sensor. However, other fastening principles are also known for which this is not necessary, such as a clip approach, for example. In addition, a seal around the pressure inlet channel is necessary in most applications in which the pressure sensor is installed in the dry space and the pressure inlet projects through the partition into the wet space. For existing air pressure sensors, this seal is achieved using a glued-on sealing foam or an injection-molded seal made of silicone, for example.

The air pressure sensor is designed to be seal-tight against water and media, regardless of the installation site. There are various reasons for this, and with regard to the manufacture, the material requirements, and the requirements for the processor and testing this represents a significant level of complexity in the manufacture of these air pressure sensors. According to the related art, the air pressure sensor has a complicated sealing design, since the air pressure in the sensor is supplied to the pressure-sensitive sensor element, while at the same time all regions in the air pressure sensor which are susceptible to media effects and corrosion must be protected. The inner seal is formed, for example, by a silicone pad which is integrated into the package, the sensor module being pressed against the pad to achieve a tight connection. To protect sensor chips and bonding wires, gelation is usually performed on the pressure sensor diaphragm. The referenced measures represent a significant level of complexity, and may also influence the characteristics of the sensor. Gelation of the diaphragm, for example, requires compound coating of the diaphragm, causing sensitivity to acceleration and thus representing an interfering factor for the air pressure sensor.

SUMMARY OF THE INVENTION

In contrast to the related art, the air pressure sensor for impact recognition has the advantage that it is hermetically sealed against external media and influences. In particular, a cost-efficient option for manufacturing the air pressure sensor is achieved using the pressure compensation element which seals off the chamber containing the sensor element. This design in particular allows simple and advantageous final installation of the air pressure sensor. This is due to the fact that an inner seal, gelation of the diaphragm, etc., may be dispensed with, since this chamber in which the sensor element is situated has a hermetically sealed design. In addition, uncomplicated and simple calibration of the air pressure sensors is possible. This is because low sensitivity of the air pressure sensor function to contamination may be achieved.

It is essential to the present invention that the pressure compensation element reliably prevents the penetration of interfering substances, for example by diffusion into the chamber in which the sensor element is situated. The transmission of pressure from the outside, i.e., the air pressure which changes in the wet space due to an impact, for example, is made possible using these pressure compensation elements.

The actual function of the air pressure sensor is thus further ensured.

The air pressure sensor in the present case is suitable for detecting increases in air pressure due to a side impact and the resulting compression of the volume of the door. In principle, the air pressure sensor is also suited for detecting a front or rear impact.

The chamber in which the sensor element for generating a signal as a function of air pressure is situated is a recess in the sensor into which the sensor element may be inserted. The sensor element is usually manufactured using micromechanical technology, and has diaphragm structures which allow the pressure to be measured due to a piezoresistive effect. Other electrical parameters such as the capacitance may also be used for the measurement. The sensor element converts the change in air pressure to an electrical signal which may be further processed.

The air pressure compensation element, which is made of plastic, for example, is functionally defined in the present case, and is intended to prevent the penetration of interfering substances into the chamber but to allow transmission of pressure into the chamber. In the present case, interfering substances are water, dust particles, and other contaminants and liquids. Gases may also be included. The "transmission of air pressure" means that the air pressure is transmitted from the outside to the inside. The problem of how to provide this air pressure transmission, in particular with regard to linear or nonlinear transmission, is discussed below.

Exemplary embodiments of the present invention are illustrated in the drawing and explained in greater detail in the following description.

BRIEF DESCRIPTION OF THE SEVERAL VIEWS OF DRAWINGS

DETAILED DESCRIPTION OF THE INVENTION

Figure 1:
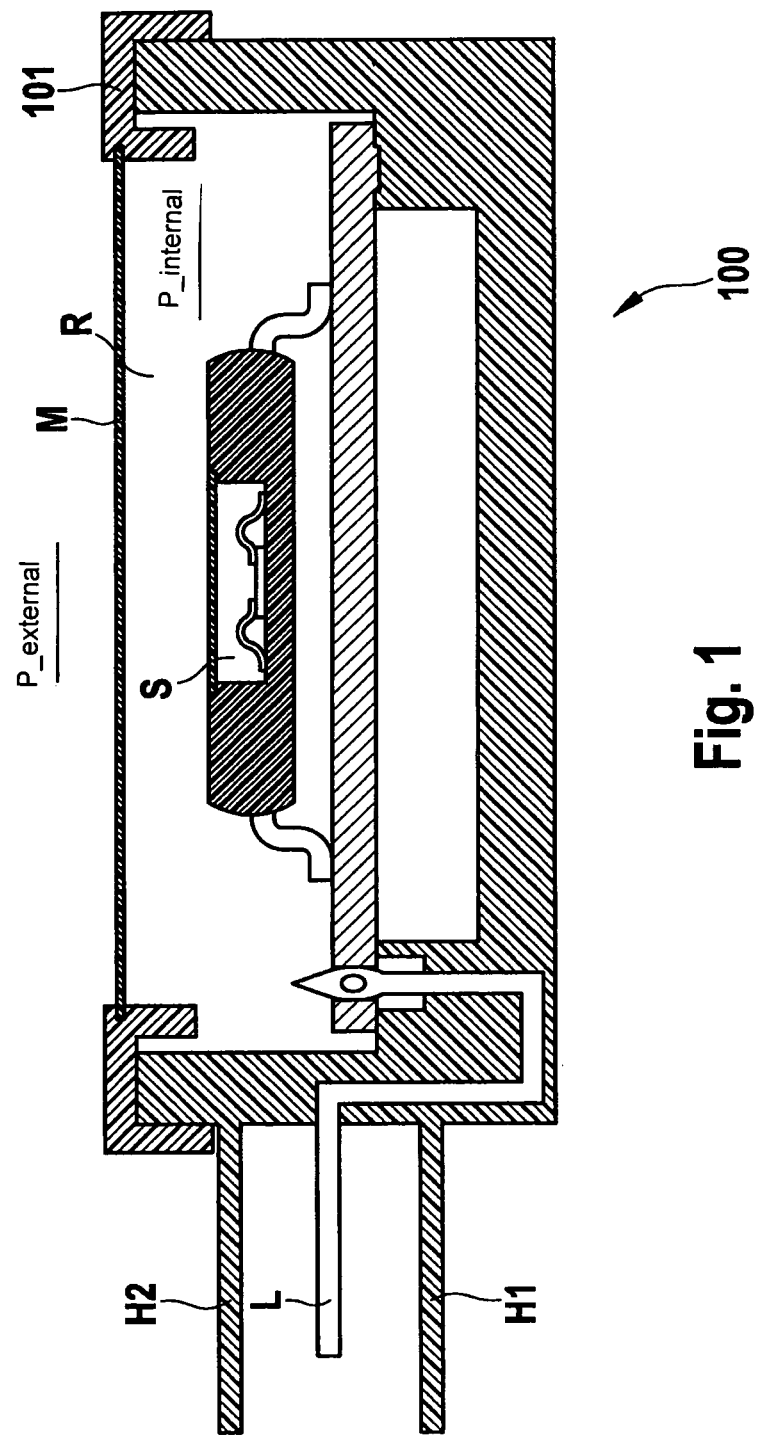
FIG. 1 shows a first cross-sectional drawing of the air pressure sensor according to the present invention.

It is advantageous that the pressure compensation element is at least one diaphragm. Thus, the pressure compensation element may also be formed by multiple diaphragms. A diaphragm is understood to mean a layer wherein penetration of interfering substances into the chamber is prevented, but transmission of pressure into the chamber from outside is possible. For this purpose the diaphragm may be made of plastic, for example. Such a plastic diaphragm or film may be used to close off the sensor housing in a cost-effective manner. In this way a separate cover may be spared. The plastic film may be supplied, on strip material, similar to a label, for example, and may be attached during the manufacturing process to the sensor housing by gluing or welding, for example. In another specific embodiment the plastic diaphragm may be integrated into the sensor cover or provided in the sensor housing. In that case, the installation of the cover is unchanged.

In addition, a portion of the pressure compensation element may be semipermeable. This also applies in the event that the pressure compensation element is designed as a diaphragm, the semipermeability achieving the object of keeping interfering substances such as water and dust from the chamber while at the same time permitting the diffusion of gases such as air into the chamber. Thus, the average ambient pressure may also be present in the interior of the sensor. This ensures that the response of the air pressure sensor to a pressure difference is then a function of the prevailing pressure in the exterior, and is not a function of pressure which at one time was incorporated into the air pressure sensor itself during manufacture. This measure may also improve the slope of the transmission function for rapidly changeable pressure differences, and in addition the necessary resolution in the air pressure sensor may be optimized due to the improved characteristic curve slope or due to the reduced working range for differential pressures, compared to a hermetically sealed sensor without this semipermeability. For the hermetically sealed air pressure sensor, in which the diaphragm only seals off the chamber, the pressure transmission function is linear only within a very small window, but in the remaining region is nonlinear with a decreasing slope with respect to larger pressure differences between the inner and the outer pressure.

The air pressure sensor is advantageously designed in such a way that the characteristic curve of the air pressure transmission is compensated for, for example using a lookup table in the air pressure sensor, or also in the evaluation system, for example in the control unit, so that, based on the measured internal pressure rise, conclusions may be drawn concerning the actual pressure rise occurring outside the chamber. Nonlinearities may thus be compensated via this lookup table. These nonlinearities relate to the pressure transmission function. The air pressure sensor itself has an electronics system which amplifies filters, digitizes, and preprocesses the signal delivered by the sensor element, and transmits the signal to the control unit. The control unit itself may be integrated into the sensor.

The pressure transmission function may be further optimized by designing the sensor volume to be as flat as possible, which is achieved by the condition that the width of the chamber is much greater than its height. A greater slope of the sensor characteristic curve may be achieved in this way. A defined externally applied pressure in each case causes a defined deflection of a diaphragm. This results in a defined absolute change in volume due to the fact that the interior volume of the sensor has a flat design, i.e., for the same diaphragm size the volume is kept as small as possible, and a defined change in pressure, and therefore in volume, in the interior space of the sensor causes a greater change in pressure.

In the design according to the present invention of the air pressure sensor, protection of the bonding wires, as well as of the diaphragms which measure via the air pressure, using a gel may advantageously be dispensed with. It is also not necessary to provide a complicated sealed pressure inlet channel in the air pressure sensor, so that special processes may largely be dispensed with.

It is also advantageous that in calibration, i.e., the use in the specific type of vehicle, of the air pressure sensor, during installation of the air pressure sensor there is little or no need to consider factors such as contamination and runoff of water and media, as is necessary according to the related art.

The cover, which as an example is designed as a diaphragm, for sealing off the air pressure sensor results in sensitivity of the sensor to acceleration, similarly as the omitted gel coating of the diaphragm. However, currently manufacturable plastic thicknesses are in the range of a few 100 micrometers, for example, so that this influence is present but is acceptable for many applications.

FIG. 1 schematically shows air pressure sensor 100 according to the present invention in a cross section. Air pressure sensor 100 has a sensor element S which is manufactured using micromechanical technology and which is installed in chamber R on a printed circuit board, for example. This chamber R is defined by the housing of sensor 100 and diaphragm M, which hermetically seals chamber R against external influences. In the example described, the cover is placed on the sensor housing and is then welded or glued. A structure 101 is used to securely adjust the cover on the housing.

Pressure P_internal is present inside chamber R, and P_external is present outside the chamber. The pressure transmission function specified by diaphragm M describes the variation in the internal pressure as a function of the external pressure. The electrical signals of the air pressure sensor are transmitted to the outside via line L (metal contacts) and are subsequently relayed to the control unit. Structures H1 and H2 are plug-in connector walls. These structures ensure secure contacting and holding of the customer-specific plug-in connector. Sensor 100 illustrated here may be installed directly in the wet space with an appropriate design of the fastening tabs.

Sensor element S changes under the air pressure present in chamber R in such a way that electrically detectable parameters such as the electrical resistance or a capacitance correspondingly change. Sensor element S itself may have a diaphragm structure or a finger-like structure.

Figure 2:
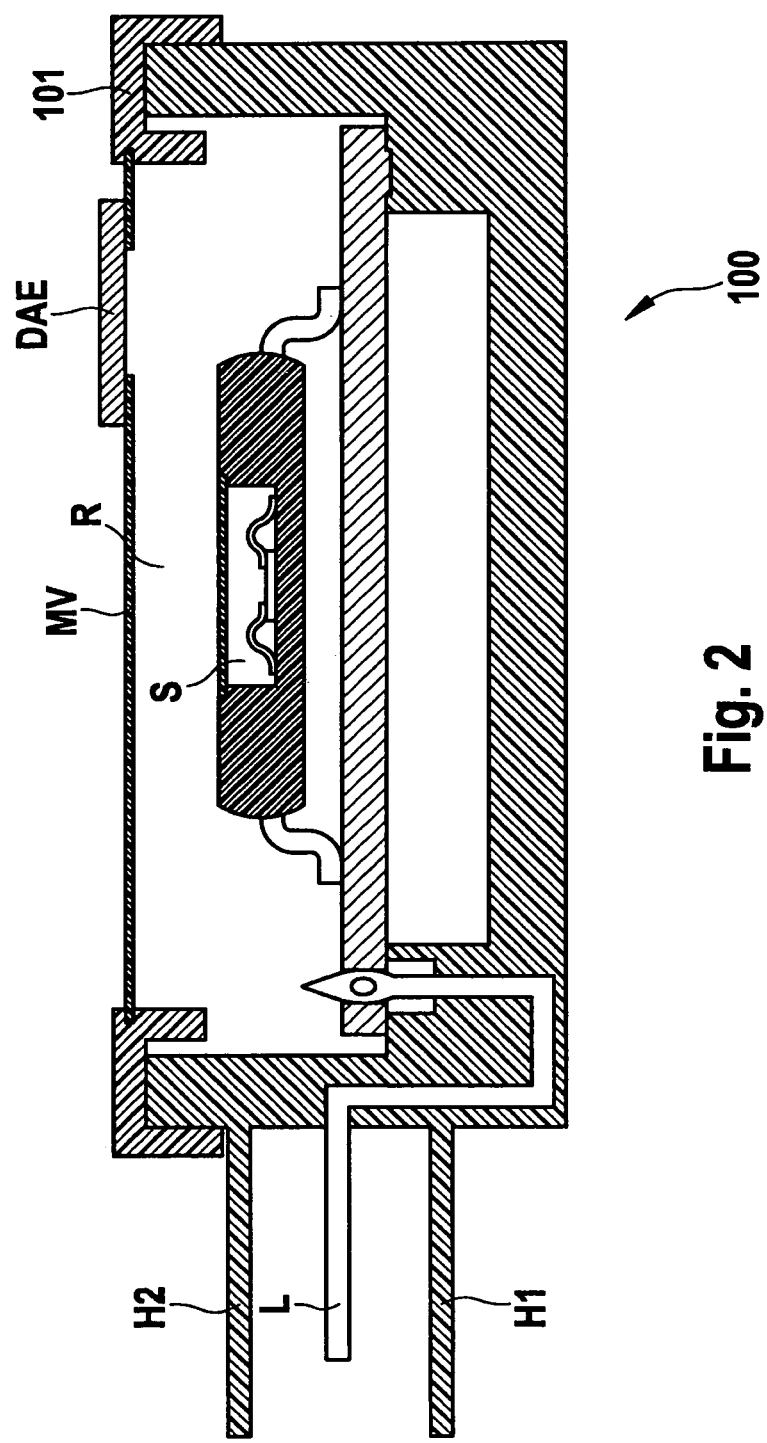
FIG. 2 shows a second cross-sectional drawing of the air pressure sensor according to the present invention.

FIG. 2 shows a further example of the air pressure sensor according to the present invention. Air pressure sensor 100 once again has a sensor element S which is situated in chamber R. Line L and a customer-specific plug-in connector (structures H1 and H2) are once again present. However, in this case diaphragm MV has a pressure compensation element DAE. This pressure compensation element is semipermeable, and allows gas, such as air, to flow through this diaphragm into chamber R, thus allowing the internal and external pressures to be equalized.

Figure 3:
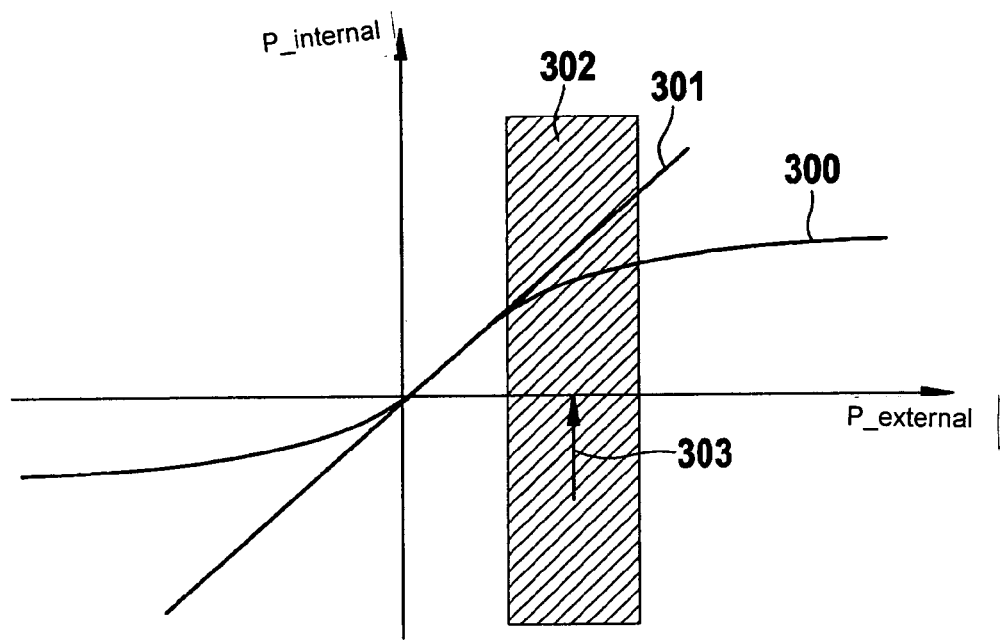
FIG. 3 shows a first example of a pressure transmission function.

FIG. 3 shows a pressure transmission function according to the air pressure sensor of FIG. 1. Curve 300 describes the pressure dependency, i.e., the variation of the internal pressure as a function of the external pressure. Curve 301 indicates the characteristic curve of the pressure transmission function of diaphragm M. Range 302 is the working range, having an average ambient pressure 303. In this example, the transmission characteristic curve of the external pressure to the internal pressure is such that the increase in pressure in the working range is approximately linear. However, the working range is not situated in the range having a maximum characteristic curve slope, and thus, maximum resolution.

Figure 4:
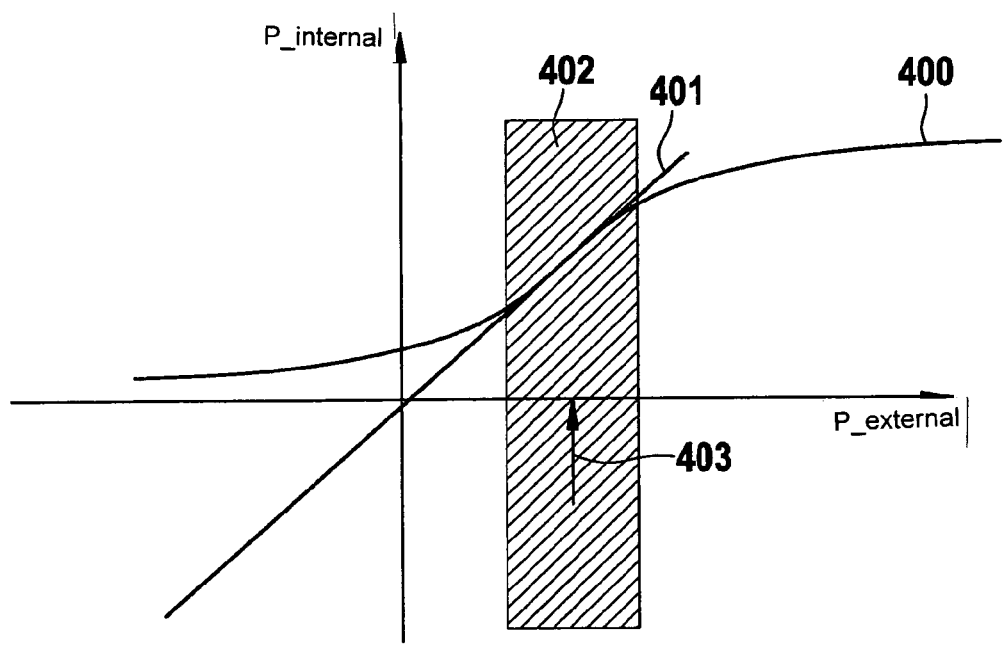
FIG. 4 shows a second example of a pressure transmission function.

FIG. 4 shows a further diagram describing the pressure transmission function. Once again curve 400 is shown which represents the internal pressure as a function of the external pressure. The linearized characteristic curve is described by curve 401. The use of a pressure compensation element DAE causes the diaphragm on the outer housing to be relaxed, since the internal and external pressures are in equilibrium. When external pressure differences occur, these cause a maximum deflection of the diaphragm, and thus, a maximum change in the internal pressure. The sensor resolution and accuracy may be optimized in such a way that, in particular for cases in which the pressure sensor is to measure dynamic pressure changes which are sufficiently rapid, the semipermeability of the diaphragm is able to cause only negligible distortion of the sensor response to the change in external pressure. Corresponding to FIG. 3, the working range is denoted by reference numeral 402, and the ambient pressure is denoted by reference numeral 403.

Figure 5:
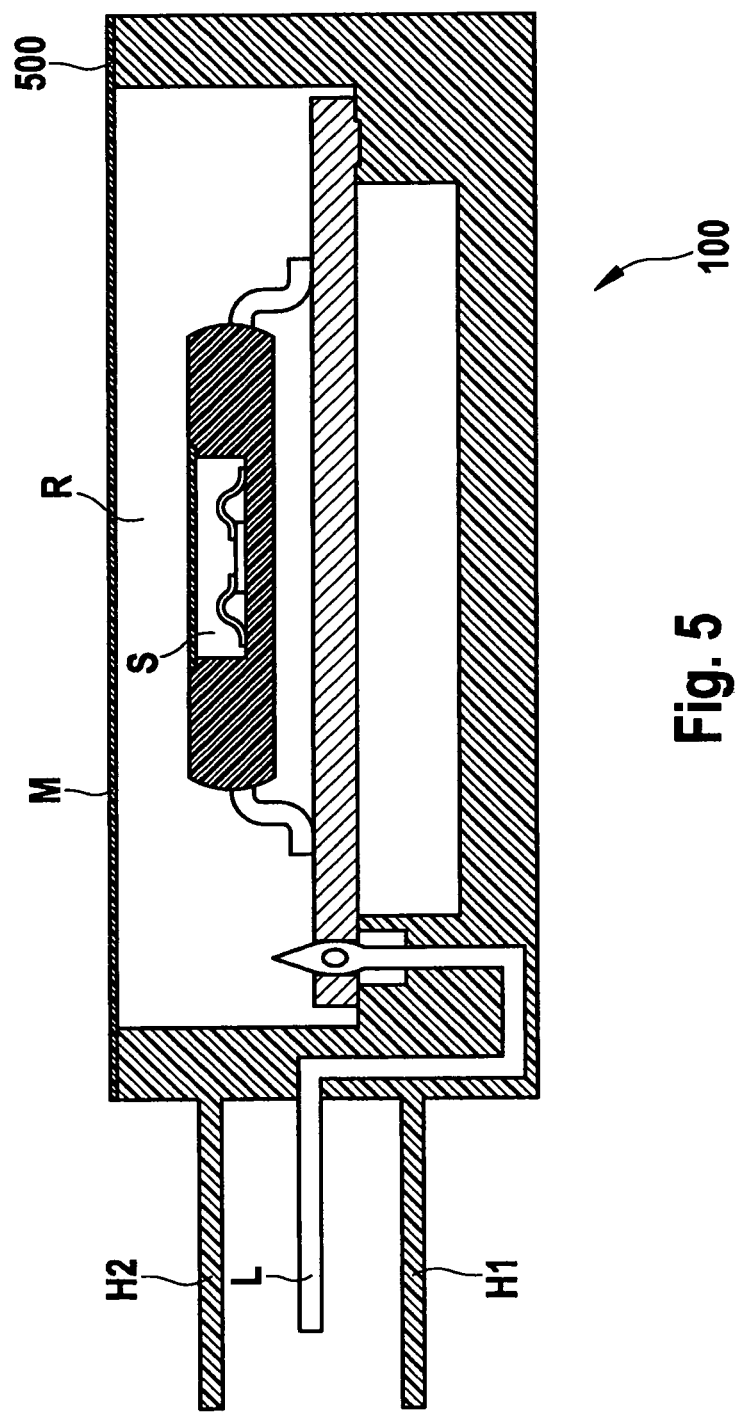
FIG. 5 shows a third cross-sectional drawing of the air pressure sensor according to the present invention.

FIG. 5 shows a further cross section schematically illustrating air pressure sensor 100 according to the present invention. In contrast to FIG. 1, in the present case the diaphragm is not integrated into the cover, and instead the diaphragm represents the complete cover. The diaphragm may be applied to the open housing as a film, using gluing or welding processes. The film may be cut to the required size before or after the covering process. In contrast to FIG. 1, structure 500 for adjusting the cover has an alternative design.

Figure 6:
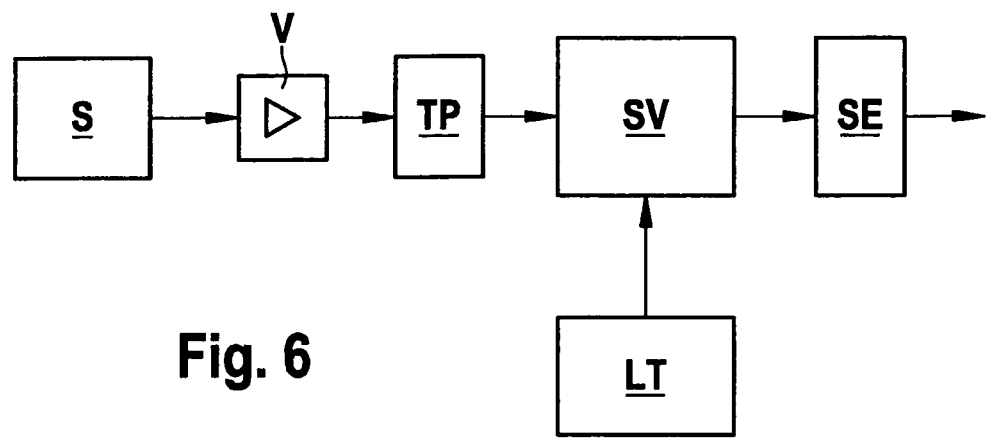
FIG. 6 shows a block diagram of the electronics system of the air pressure sensor according to the present invention.

FIG. 6 shows a block diagram of the electronics system of the sensor according to the present invention. Sensor element S sends the signal as a function of the measured pressure to an amplifier V which amplifies this signal and relays it to a low-pass filter TP. The signal filtered by the low-pass filter enters a signal processor SV, which performs digitization and modifies the value as a function of values from lookup table LT. Signal processor SV transmits the digitized measured value, which is corrected, to transmitter unit SE, which transmits this value in a specified protocol to the control unit.

Figure 7:
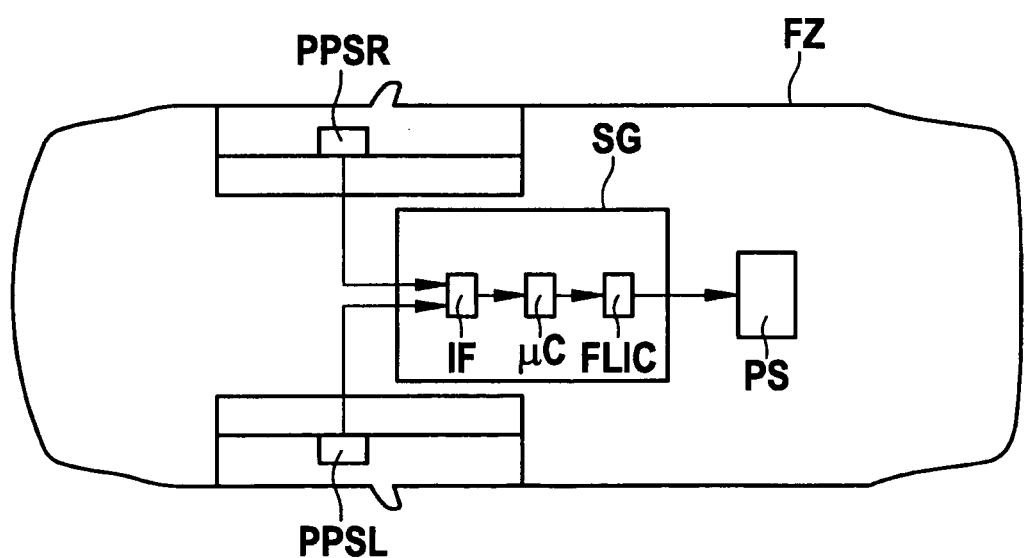
FIG. 7 shows the design of an occupant protection system in the vehicle.

FIG. 7 shows an occupant protection system in a vehicle FZ. Two air pressure sensors PPSR and PPSL are installed in the right and left vehicle doors, respectively, in particular in the wet space, i.e., on the side facing away from the vehicle. These air pressure sensors PPSR and PPSL are connected to an interface IF of a control unit SG for actuating occupant protection means. Control unit SG processes the air pressure signals with the aid of a microcontroller µC, taking a loaded algorithm and specified parameters into account. Signals of other sensors are used here for plausibility checking, for example. However, for the sake of simplicity other components are not illustrated, since they do not contribute to an understanding of the present invention.

As a function of the evaluation of the air pressure signals, microcontroller µC transmits signals to control circuit FLIC, which has electrical power switches, for example, which supply the electrical power to ignition elements, for example, to actuate the appropriate occupant protection means. These occupant protection means are then appropriately supplied with power by control circuit FLIC. In the present case, the occupant protection means are denoted by reference symbol PS. Airbags, seat belt tensioners, etc., may be used as occupant protection means.

What is claimed is:

1. An air pressure sensor for impact detection, comprising:
a chamber;
a sensor element for generating a signal as a function of the air pressure, the sensor element being situated in the chamber; and
a pressure compensation element which seals off the chamber;
wherein the pressure compensation element prevents penetration of interfering substances into the chamber but allows transmission of pressure into the chamber from the outside.

2. The air pressure sensor as recited in claim 1, wherein the pressure compensation element is at least one diaphragm.

3. The air pressure sensor as recited in claim 1, wherein at least a portion of the pressure compensation element is semipermeable.

4. The air pressure sensor as recited in claim 2, wherein at least a portion of the pressure compensation element is semipermeable.

5. The air pressure sensor as recited in claim 1, wherein the air pressure sensor has compensation means for a characteristic curve of the pressure transmission.

6. The air pressure sensor as recited in claim 2, wherein the air pressure sensor has compensation means for a characteristic curve of the pressure transmission.

7. The air pressure sensor as recited in claim 3, wherein the air pressure sensor has compensation means for a characteristic curve of the pressure transmission.

8. The air pressure sensor as recited in claim 5, wherein the compensation means have at least one lookup table.

9. The air pressure sensor as recited in claim 6, wherein the compensation means have at least one lookup table.

10. The air pressure sensor as recited in claim 7, wherein the compensation means have at least one lookup table.

11. The air pressure sensor as recited in claim 1, wherein the width of the chamber is much greater than its height.

12. The air pressure sensor as recited in claim 2, wherein the width of the chamber is much greater than its height.

13. The air pressure sensor as recited in claim 3, wherein the width of the chamber is much greater than its height.

14. The air pressure sensor as recited in claim 5, wherein the width of the chamber is much greater than its height.

15. The air pressure sensor as recited in claim 1, wherein the pressure compensation element is plastic.

16. The air pressure sensor as recited in claim 3, wherein the pressure compensation element is plastic.

17. The air pressure sensor as recited in claim 16, wherein the pressure compensation element is at least one diaphragm.

* * * * *

UNITED STATES PATENT AND TRADEMARK OFFICE
CERTIFICATE OF CORRECTION

PATENT NO. : 8,544,333 B2  Page 1 of 1
APPLICATION NO. : 12/736497
DATED : October 1, 2013
INVENTOR(S) : Adam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 152 days.

Signed and Sealed this
Fifteenth Day of September, 2015

Michelle K. Lee
*Director of the United States Patent and Trademark Office*